United States Patent [19]

Wakatake

[11] 4,177,458

[45] Dec. 4, 1979

[54] DISPLAY PANEL AND DISPLAY ELEMENTS THEREFOR

[75] Inventor: Yoshimasa Wakatake, Tokyo, Japan

[73] Assignee: Nihon Advanced Products Kabushiki Kaisha, Tokyo, Japan

[21] Appl. No.: 871,700

[22] Filed: Jan. 23, 1978

[30] Foreign Application Priority Data

Jan. 24, 1977 [JP] Japan .................................. 52-6523

[51] Int. Cl.[2] .............................................. G06K 15/18

[52] U.S. Cl. ...................................... 340/373; 40/449; 340/378.5; 340/764

[58] Field of Search ..................... 340/373, 334, 378.5, 340/764; 40/449, 503, 504, 505, 512, 526, 532

[56] References Cited

U.S. PATENT DOCUMENTS

| | | | |
|---|---|---|---|
| 3,267,595 | 8/1966 | Levy et al. | 340/334 |
| 3,307,170 | 2/1967 | Aoyama et al. | 340/334 |
| 3,518,664 | 6/1970 | Taylor | 340/373 |
| 3,591,939 | 7/1971 | Payne et al. | 40/449 |
| 3,754,242 | 8/1973 | Ehrat | 340/373 |

*Primary Examiner*—David L. Trafton

*Attorney, Agent, or Firm*—Gerald J. Ferguson, Jr.; Joseph J. Baker

[57] ABSTRACT

A display panel which is provided with a display surface structure having a large number of display elements rotatably arranged in a vertical plane. The display elements are each formed with a plate-like (or four-cornered) block member having two (or four) display surfaces of different colors and one (or three) magnetic pieces. A selected one or ones of the display elements are rotated by the movement of a display control head or heads and by temporary energization of one (or three) magnets of each head to make a selected one of the two (or four) display surfaces of the selected display elements face forwardly, providing a display of a character, graph, pattern or the like on the display surface structure.

7 Claims, 20 Drawing Figures

DISPLAY PANEL AND DISPLAY ELEMENTS THEREFOR

BACKGROUND OF THE INVENTION

1. Field of the Invention

This invention relates to a display panel which has a large number of display elements arranged in the same vertical plane to provide a display of a character, graph, pattern or the like, and display elements for use in the display panel.

2. Description of the Prior Art

This conventional types of display panels are employed for providing a display of a traffic sign, a directional sign, an advertisement, time, date or like information. Display elements used in the past are usually formed with electrophoto conversion elements, and hence are of large power consumption. Further, the conventional display elements are readily broken by an external force and shortlived.

SUMMARY OF THE INVENTION

Accordingly, this invention is to provide a novel display panel free from the above-said defect of the prior art and display elements for use in the display panel.

BRIEF DESCRIPTION OF THE DRAWINGS

FIGS. 1A and 1B show in elevation a first embodiment of the display panel of this invention;

FIGS. 7A and 7B show in elevation a second embodiment of the display panel of this invention;

DESCRIPTION OF THE PREFERRED EMBODIMENTS

Figure 1B:
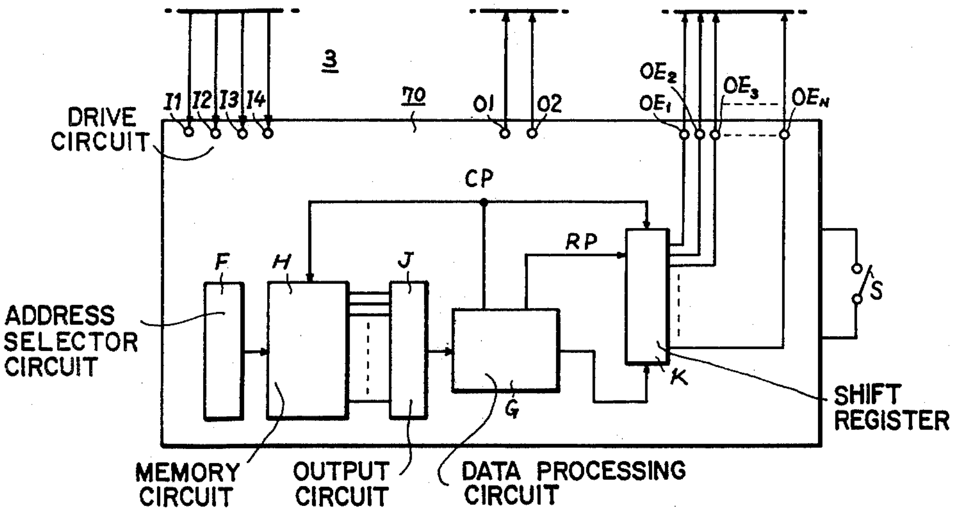
FIGS. 1A and 1B are interconnected.
Figure 1:
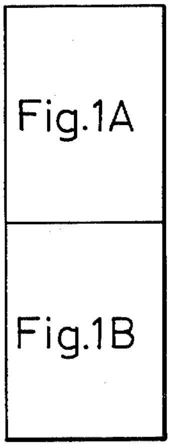
FIG. 1 illustrates how
Figure 1A:
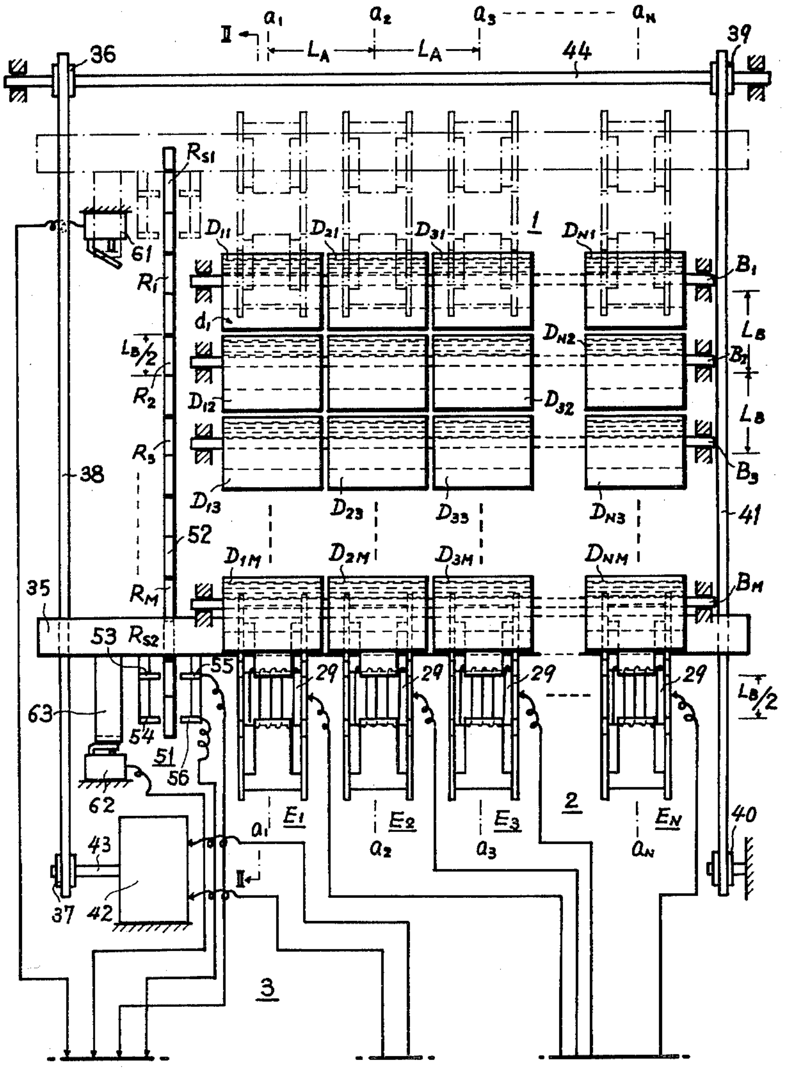
Figure 2:
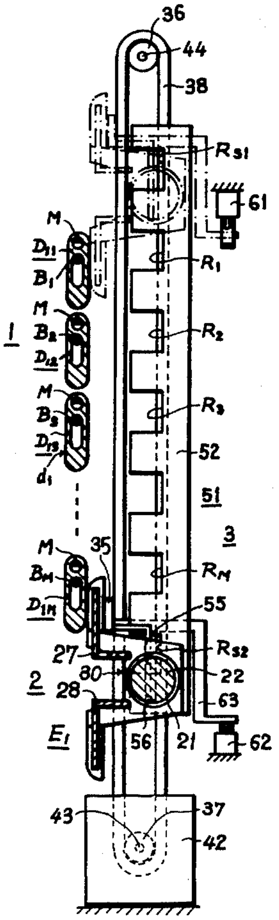
FIG. 2 is a sectional view taken on the line II—II in FIG. 1A.

FIGS. 1 and 2 illustrates an embodiment of a display device of this invention, which is composed of a display surface structure 1, a display switching unit 2 and a drive unit 3.

Figures 3A, 3B:
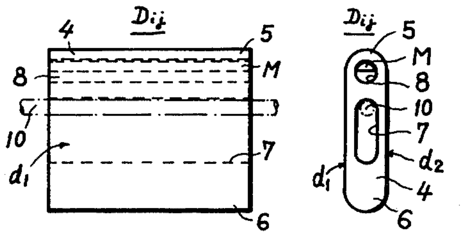
FIGS. 3A and 3B are respectively a front view of an example of the display element of this invention and its right side view.
Figures 4A, 4B:
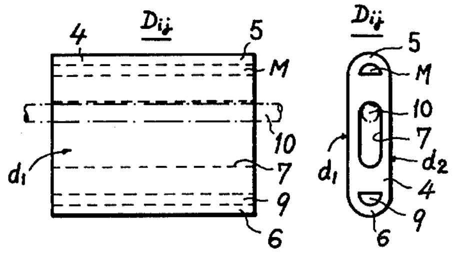
FIGS. 4A and 4B are respectively a front view of another example of the display element and its right side view.

In the illustrated example of the display surface structure 1, letting N vertical lines of arrangement spaced a predetermined distance $L_A$ from adjacent ones of them in a horizontal direction be represented by $a_1, a_2, \ldots a_N$, respectively M display elements $D_{i1}, D_{i2}, \ldots D_{iM}$ are disposed on the vertical line $a_i$ $(i+1, 2, \ldots N)$ at predetermined intervals $L_B$ in a vertical direction. In this instance, the display element $D_{ij}$ $(j+1, 2, \ldots M)$ has a construction such, for example, as shown in FIGS. 3A and 3B in which a plate-like member 4 formed as of a synthetic resin material has a pair of opposed display surfaces $d_1$ and $d_2$ of different colors, for example, red and white, in which a magnetic piece M is embedded in one of upper and lower end portions 5 and 6 of the plate-like member 4, for example, in the upper end portion 5 to extend laterally of the plate-like member 4 and in which a shaft receiving hole 7 is formed in the plate-like member 4 so that when the plate-like member 4 is supported by a shaft 10, the opposed display surfaces $d_1$ and $d_2$ may lie in vertical planes, respectively. In this case, in order that the upper and lower half portions of the plate-like members 4 may be of substantially the same mass, a through hole 8 having a semicircular cross section is formed in the plate-like member 4 in the portion where the magnetic piece M is disposed so as to remove substantially the same mass as that of the magnetic piece M, as shown in FIGS. 3A and 3B, or a non-magnetic piece 9 of substantially the same mass as that of the magnetic piece M is embedded in the plate-like member 4 to extend laterally thereof at a position symmetrical to the magnetic piece M with respect to the center of the plate-like member 4, as depicted in FIGS. 4A and 4B. The shaft receiving hole 7 is formed centrally of the plate-like member 4 to extend in parallel to the display surfaces $d_1$ and $d_2$. Accordingly, when a shaft 10 is loosely inserted into the hole 7 of the plate-like member 4, the plate-like member 4 is supported by the shaft 10 engaged with the upper or lower inner wall of the hole 7 due to the tare of the plate-like member 4, in which case the display surfaces $d_1$ and $d_2$ lie in vertical planes, respectively. The abovesaid display elements $D_{i1}, D_{i2}, \ldots D_{iM}$ are supported by horizontal shafts $B_1, B_2, \ldots B_M$ loosely inserted into the shaft receiving holes 7, respectively, the horizontal shafts being arranged in side-by-side and parallel relation at the aforesaid intervals $L_B$, for example, in the vertical direction. Therefore, the display surfaces $d_1$ or $d_2$ of the display elements $D_{11}$ to $D_{N1}$, $D_{12}$ to $D_{N2}$, ... $D_{1M}$ to $D_{NM}$ which face forwardly lie in the same vertical plane.

Figure 5A:
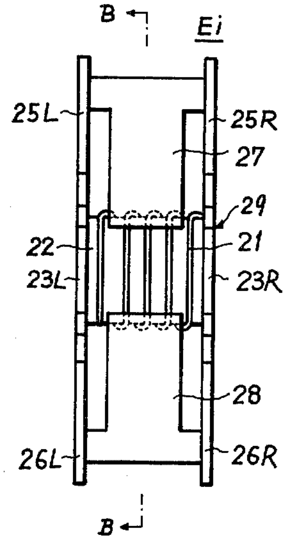
FIGS. 5A and 5B are respectively a front view of an example of a display control head applicable to the first embodiment of the display panel of this invention and a sectional view taken on the line B—B in FIG. 5A.
Figure 5B:
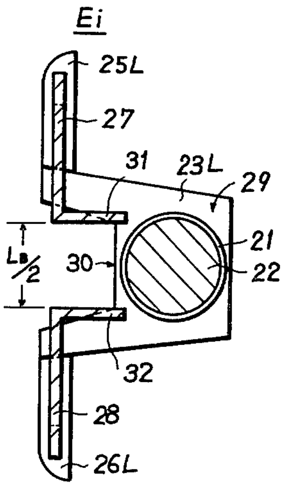

An example of the display switching unit 2 has a display control head $E_i$ disposed to be movable along the aforesaid vertical line $a_i$. In this case, as shown in FIGS. 5A and 5B, the display switch $E_i$ has a magnetic core 22 having wound thereon a coil 21 and having, for instance, a circular cross section, trapezoidal magnetic plates 23L and 23R respectively attached to both ends of the magnetic core 22, non-magnetic guide pieces 25L, 25R and 26L, 26R respectively attached to upper and lower edges of the front end portions of the magnetic plates 23L and 23R to extend upwardly and downwardly thereof, and leaf springs 27 and 28 respectively fixed at one end to the guide pieces 25L, 25R and 26L, 26R and extending at the other end towards the magnetic core 22. The magnetic core 22 and the magnetic plates 23L and 23R form an electromagnet 29. The distance between the magnetic plates 23L and 23R is selected to be smaller than the length of the display element $D_{ij}$ in the lateral direction. The magnetic plates 23L and 23R of the display control head $E_i$ each have a trapezoidal recess 30 so that when the display element $D_{ij}$ is rotated as described later, it does not collide with the magnetic plates 23L and 23R. The free ends of the leaf springs 27 and 28 are respectively bent back substantially at right angles to form bent portions 31 and 32. The distance between the bent portions 31 and 32 is selected to be approximately ½ of the aforesaid vertical distance $L_B$ between the display elements. The display control head $E_i$ is disposed opposite the aforesaid vertical line $a_i$ on a horizontal rod 3 in such a manner that the front end faces of the magnetic plates 23L and 23R and the guide pieces 25L, 25R, 26L and 26R may lie adjacent the display surface $d_1$ or $d_2$ of the display element $D_{ij}$. The horizontal rod 3 is disposed behind the horizontal shaft $B_j$ and adapted to be movable in the vertical direction.

An example of the drive unit 3 has a belt, chain or like strap member 38 stretched between a pair of pulleys 36 and 37 disposed in the vertical direction, for example, on the left of the display surface structure 1 and spaced a predetermined distance from each other and a similar strap member 41 stretched between a pair of pulleys 39 and 40 likewise disposed in the vertical direction on the right of the display surface structure 1 and spaced a predetermined distance from each other. The horizontal rod 35 of the abovesaid display switching unit 2 is secured at both ends to the strap members 38 and 41. A rotary shaft 43 of a motor 42 is coupled, for instance, to the pulley 37 and a shaft 44 is bridged between the pulleys 36 and 39 so that the strap members 38 and 39 may be moved by the rotation of the motor 42 up or down in synchronism with each other. Accordingly, the horizontal rod 35 is moved up and down while being held horizontal. The drive unit 3 has a detecting mechanism 51 for detecting the position of the horizontal rod 35. An example of the detecting mechanism 51 has a position detecting plate 52 which is disposed on the left of the display elements $D_{11}$, $D_{12}$, . . . $D_{1M}$ to extend in the vertical direction and whose front marginal edge has rectangular recesses $R_1$ to $R_M$, each formed to extend upwardly from the position corresponding to the center of the display element $D_{1j}$ in the vertical direction to a position spaced a distance ½ the interval $L_B$ from the abovesaid position, and light emitting elements 53 and 54 and photo detectors 55 and 56 which are disposed opposite the bent portions 31 and 32 of the leaf springs 27 and 28 of the display control head $E_i$ in such a manner that the light emitting elements 53 and 54 and the photo detectors 55 and 56 are opposed to each other across the position detecting plate 52. The photo detectors 55 and 56 each provide a detected output "1" or "0" in the binary representation depending on whether the recess $R_j$ exists or not between each of the photo detectors 55 and 56 and each of the light emitting elements 53 and 54. In practice, the position detecting plate 52 has at least the aforesaid recesses $R_1$ to $R_M$ and similar recesses $R_{S1}$ and $R_{S2}$ formed at positions spaced the distance $L_B$ from the uppermost and lowermost recesses $R_1$ and $R_M$, respectively. Further, the drive unit 3 has detecting switches 61 and 62 for detecting the positions of the upper and lower ends of the horizontal rod 35, respectively. The detecting switch 61 is adapted to provide an output "1" in the binary representation upon engagement with an engaging piece 63 of the horizontal rod 35 when the magnetic pieces 23L and 23R of the display control head EHD i mounted on the horizontal rod 35 are moved out of the opposing relation with the display element $D_{i1}$. The detecting switch 62 is similarly adapted to provide an output "1" in the binary representation upon engagement with an engaging piece 63 of the horizontal rod 35 when the magnetic pieces 23L and 23R of the display switch $E_i$ are moved out of the opposing relation with the display play element $D_{iM}$. Moreover, the drive unit 3 has a drive circuit 70 for driving the electromagnet 29 of the discontrol head $E_i$ of the display switching unit 2. The drive circuit 70 comprises, for instance, a memory circuit H, an address selector circuit F, an output circuit J, a data processing circuit G and a shift register K. The memory circuit H is designed to store information "1" or "0" for selecting the display surfaces $d_1$ or $d_2$ of the display elements $D_{11}$ to $D_{N1}$, $D_{12}$ to $D_{N2}$, . . . $D_{1M}$ to $D_{NM}$ of the display surface structure 1. That is, N information of the display elements $D_{11}$ to $D_{N1}$ are stored as first parallel information at a first address, N information of the display elements $D_{12}$ to $D_{N2}$ are stored as second parallel information at a second address, . . . and N information of the display elements $D_{1M}$ to $D_{NM}$ are stored as Mth parallel information at an Mth address. The N information making up the jth parallel information stored at the jth address selected by the address selector circuit F are read out one by one upon each occurrence of a read control pulse from the data processing circuit G. The address selector circuit F is adapted to sequentially select the first, second, . . . Mth addresses of the memory circuit H for sequentially reading out the M parallel information stored in the memory circuit H. The output circuit J receives and outputs the N jth parallel information read out of the memory circuit H. The data processing circuit G receives the sequential information from the output circuit J to generate pulses upon each reception of the information, which pulses are applied as a read control pulse and a shift pulse to the memory circuit H and the shift register K, respectively. The data processing circuit G is also adapted to provide a reset pulse RP for resetting the shift register K. The shift register K has first to Nth digits and is designed so that the N information sequentially applied from the data processing circuit G are stored at the N digits, respectively, and are simultaneously read out thereof. Further, the drive circuit 70 has input terminals I1 and I2 supplied with the detected outputs from the aforesaid detecting switches 61 and 62, respectively, input terminals I3 and I4 supplied with the detected outputs from the photo detectors 55 and 56, respectively, output terminals O1 and O2 connected to forward and backward revolution input sides of the motor 42, respectively, an output terminal $OE_i$ connected to the coil 21 of the electromagnet 29 of the display control head $E_i$ and a power source switch S. When the horizontal rod 35 of the display switching unit 2 lies at its lowermost position to maintain the horizontal switch 62 in its ON state, if the power source switch S is turned ON for a very short period of time, an output signal is derived from the output terminal O1. While the output signal is obtained from the output terminal O1, if the detected output "1" in the binary representation is supplied from the photo detector 55 to the input terminal I3, N information "1" in the binary representation and N pulses Cp are sequentially provided from the data processing circuit G and the shift register K is sequentially shifted upon occurrence of each of the N pulses CP, with the result that the N information "1" are stored in the N digits of the shift register K. Then, when the detected output from the photo detector 55 becomes "0", the N information stored in the shift register K are derived at the output terminals $OE_1$ to $OE_N$, respectively. Then, when the output from the photo detector 55 is altered to "1", no outputs are provided at the output terminals $OE_1$ to $OE_N$ and, at the same time, the shift register K is reset by the reset pulse RP to store again the N information "1" from the data processing circuit G. And then, when the output from the photo detector 55 becomes "0" again, the outputs are obtained at the outputs terminal $OE_1$ to $OE_N$ in the same manner as described above and thereafter the abovesaid operation is repeated. Upon application of the detected output from the detecting switch 61 to the input terminal I1, an output signal is provided at the output terminal O2 in place of the output terminal O1. Then the output "0" in the binary representation is fed to the input terminal I4 from the photo detector 56 in the state that the output signal is provided at the output terminal O2, the address selector circuit F, the memory circuit H, the data processing circuit G and the shift register K are controlled, by which the N information stored in the memory circuit H are sequentially read out and applied via the output circuit J to the shift register K and the shift register K is controlled by the N shift pulses CP, so that the N information is stored in the N digits of the shift register K. Then, when the output supplied from the photo detector 56 to the input terminal I4 becomes "1", the N information stored in the N digits of the shift register K are derived at the output terminals $OE_1$ to $OE_N$, respectively. Then, when the output from the photo detector 56 is altered to "0", the information obtained at the output terminals $OE_1$ to $OE_N$ are no more obtained and, at the same time, the shift register K is reset by the reset pulse RP and then the address selector circuit F, the memory circuit H and the data processing circuit G are controlled in the same manner as described above, by which the N information stored in the memory circuit H at the second address are sequentially read out and stored in the shift register K. Then, when the output from the photo detector 56 becomes "1" again, the information stored in the shift register K are led out to the output terminals $OE_1$ to $OE_N$ in the same manner as described above and thereafter the abovesaid operations are repeated. Further, when the detected output "1" in the binary representation is supplied from the detecting switch 62 to the input terminal I2, no output is obtained from the output terminal O2.

Figure 6A:
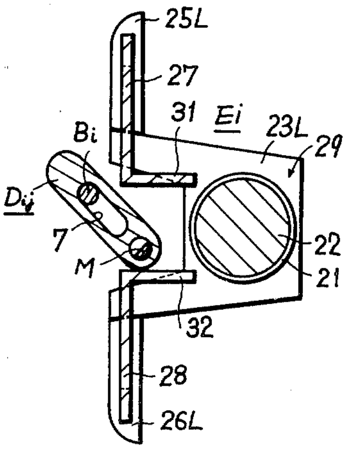
FIGS. 6A and 6B are diagrams explanatory of the operation of the first embodiment of this invention.
Figure 6B:
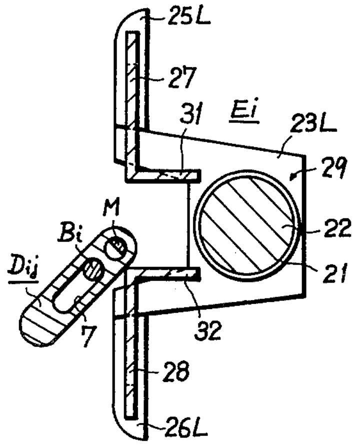

The above is the construction of a first embodiment of this invention. With such an arrangement, if the power source switch S of the drive circuit 70 of the drive unit 3 is controlled to be turned ON for a very short period of time on the assumption that the horizontal rod 35 of the display switching unit 2 lies at its lowermost position to hold the detecting switch 62 in the ON state, an output is provided from the output terminal O1 to drive the motor 42 in its forward direction, by which the strap members 38 and 41 are driven clockwise in FIG. 2 to move the horizontal rod 35 upwardly. As the horizontal rod 35 is thus moved up, the photo detector 55 moves into the opposing relation with the recess $R_{S2}$ of the position detecting plate 52, so that an output "1" is obtained from the photo detector 55 and, in accordance with this, the information "1" from the data processing circuit G is stored in all of the digits of the shift register K of the drive circuit 70. Then, when the horizontal rod 35 is further moved to bring the photo detector 55 into the opposing relation to the portion between the recesses $R_{S2}$ and $R_M$, the output from the photo detector 55 becomes "0" to derive outputs from the output terminals $OE_1$ to $OE_N$ as described above, energizing the electromagnets 29 of the display control heads $E_1$ to $E_N$. In such a state, the electromagnets 29 of the display control heads $E_1$ to $E_N$ lie opposite the lower end portions of the display elements $D_{1M}$ to $D_{NM}$, so that if the display element $D_{iM}$ is assumed to lie with its magnetic piece M held at the lowered position, that is, with the display surface $d_2$ held on the front side of the plate-like member 4, the magnetic piece M of the display element $D_{iM}$ is attracted by the electromagnet 29 of the display control head $E_i$, as depicted in FIG. 6A, and the end portion of the display element $D_{iM}$ on the side of the magnetic piece M is inserted between the bent portions 31 and 32 of the leaf springs 27 and 28 to engage the bent portion 32. Then, when the horizontal rod 35 is further brought up to move the photo detector 55 into the opposing relation to the recess $R_M$, an output "1" is provided from the photo detector 55, so that no outputs are obtained from the output terminal $OE_1$ to $OE_N$, as described above and the electromagnets 29 of the display control heads $E_1$ to $E_N$ are de-energized and N information "1" from the data processing circuit G are newly stored in the shift register K of the drive circuit 70. At the same time, the aforesaid display element $D_{iM}$ is further rotated through more than 90° to bring the display surface $d_1$ to the front side after the state shown in FIG. 6B, that is, the display element $D_{iM}$ is rotated through 180°. Thereafter, as the horizontal rod 35 moves, the display elements $D_{i(M-1)}, \ldots D_{i2}, D_{i1}$ are sequentially rotated through 180° only when their magnetic pieces M lie on the lower side. Consequently, by the upward movement of the horizontal rod 35, the display surfaces $d_1$ of the display elements $D_{11}$ to $D_{N1}$, $D_{12}$ to $D_{N2}, \ldots D_{1M}$ to $D_{NM}$ are all brought to the front. When the horizontal rod 35 has reached its uppermost position to turn ON the detecting switch 61 to derive therefrom the detected output "1" in the binary representation, an output is provided at the output terminal O2 of the drive circuit 70 in place of the output obtained at the output terminal O1 until then. Accordingly, the motor 42 is driven in the direction reverse to that in the abovesaid case to rotate the strap members 38 and 41 counterclockwise in FIG. 2, so that the horizontal rod 35 is moved down. Then the photo detector 56 moves into the opposing relation to the portion of the position detecting plate 52 between the recesses $R_{S1}$ and $R_1$, an output "0" is derived from the photo detector 56 to control the memory circuit H, the address selector circuit F, the data processing circuit G and the shift register K of the drive circuit 70, by which the first parallel information for the display elements $D_{11}$ to $D_{N1}$ stored in the memory circuit H are read out and stored in the shift register K. Then, when the horizontal rod 35 is further moved down to such a position where the photo detector 56 lies opposite the recess $R_1$, an output "1" is provided from the photo detector 56, by which outputs are provided from those of the output terminals $OE_1$ to $OE_N$ corresponding to those of the N information stored in the shift register K which are "1". Consequently, the electromagnets 29 of only selected one or ones of the display switches $E_1$ to $E_N$ are energized and the magnetic pieces M of that selected one or ones of the display elements $D_{11}$ to $D_{1N}$ which lie opposite the electromagnets 29 of the selected display control heads, are attracted by the electromagnets 29 to be rotated clockwise in FIG. 2 and the end portions on the side of the magnetic pieces M are inserted into the bent portions 31 and 32 of the leaf springs 27 and 28 of the selected display control heads to engage with the bent portions 31, respectively. Then, when the photo detector 56 moves into the opposing relation to the part of the position detecting plate 52 between the recesses $R_1$ and $R_2$, since the output from the photo detector 56 becomes "0" the shift register K of the drive circuit 70 is reset and, at the same time, the second parallel information for the display elements $D_{12}$ to $D_{N2}$ stored in the memory circuit H are read out by the address selector circuit F and are again stored in the shift register K. Simultaneously with this, the selected one or ones of the display elements $D_{11}$ to $D_{N1}$ are rotated in excess of 90° to bring their display surfaces $d_2$ to the front side. After all, only the selected display elements are turned through 180°. Next, when the photo detector 56 moves into the opposing relation to the recess $R_2$, outputs are obtained from that selected one or ones of the output terminals $OE_1$ to $OE_N$ of the drive circuit 70 corresponding to those of the N information stored in the shift register K which are "1", as is the case with the above and only selected ones of the display elements $D_{12}$ to $D_{N2}$ are rotated clockwise in FIG. 2. Thereafter, only selected ones of the display elements $D_{13}$ to $D_{N3}$, $D_{14}$ to $D_{N4}$, . . . $D_{1M}$ to $D_{NM}$ are sequentially rotated. When the horizontal rod 35 is brought down to its lowermost position to turn ON the detecting switch 62 to derive therefrom a detected output "1", the output is no more produced from the output terminal O2, stopping the rotation of the motor.

In accordance with the first embodiment of this invention described above, all of the display surfaces $d_1$ of the display elements $D_{11}$ to $D_{N1}$, $D_{12}$ to $D_{N2}$, . . . $D_{1M}$ to $D_{NM}$ can be made to face forwardly and once information of a desired pattern is stored in the memory circuit of the drive circuit 70, the display surfaces $d_2$ of desired ones of the display elements can be made to face forwardly, so that a desired character, symbol, graph, pattern or the like can be displayed with the display surfaces $d_1$ and $d_2$ of the elements $D_{11}$ to $D_{N1}$, $D_{12}$ to $D_{N2}$, . . . $D_{1M}$ to $D_{NM}$, and such a display can be produced with a simple construction. Further, since the display element $D_{ij}$ has such a simple construction that the magnetic piece M is embedded at one corner of the plate-like member 4 having the pair of opposed display surfaces $d_1$ and $d_2$ and that the shaft receiving hole 7 is formed in the plate-like member 4 so as to make the display surfaces $d_1$ and $d_2$ lie in the vertical planes when the plate-like member 4 is supported by the shaft 10, the distance between adjacent ones of the display elements can be made small. Moreover, since there is no need of providing any special position defining means for retaining the display surfaces of the display elements in the vertical planes, the overall apparatus can be simplified and reduced in size correspondingly.

Figure 7B:
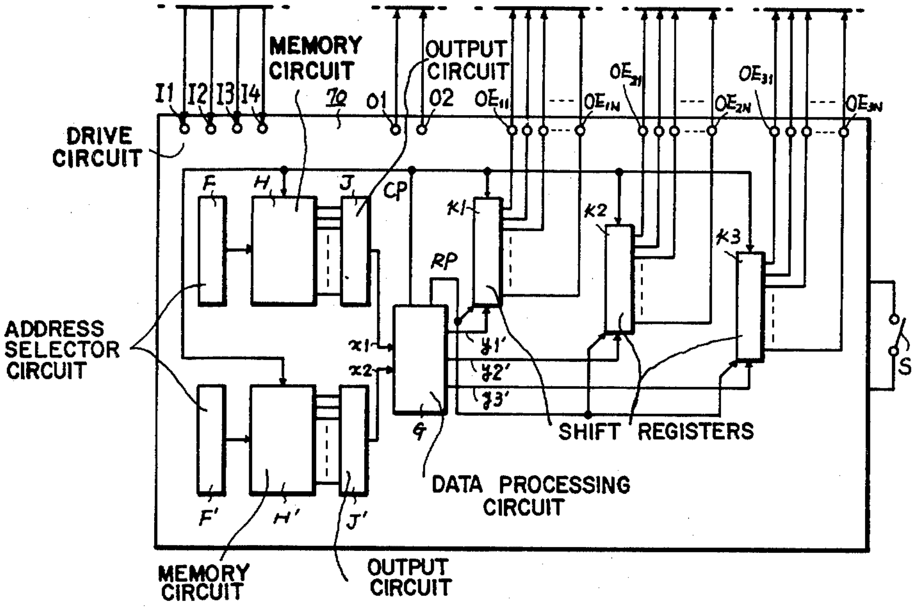
FIGS. 7A and 7B are interconnected.
Figure 7:
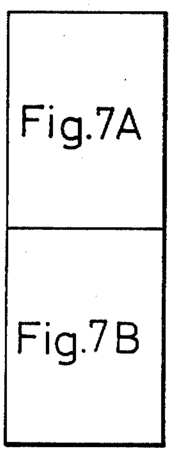
FIG. 7 illustrates how
Figure 7A:
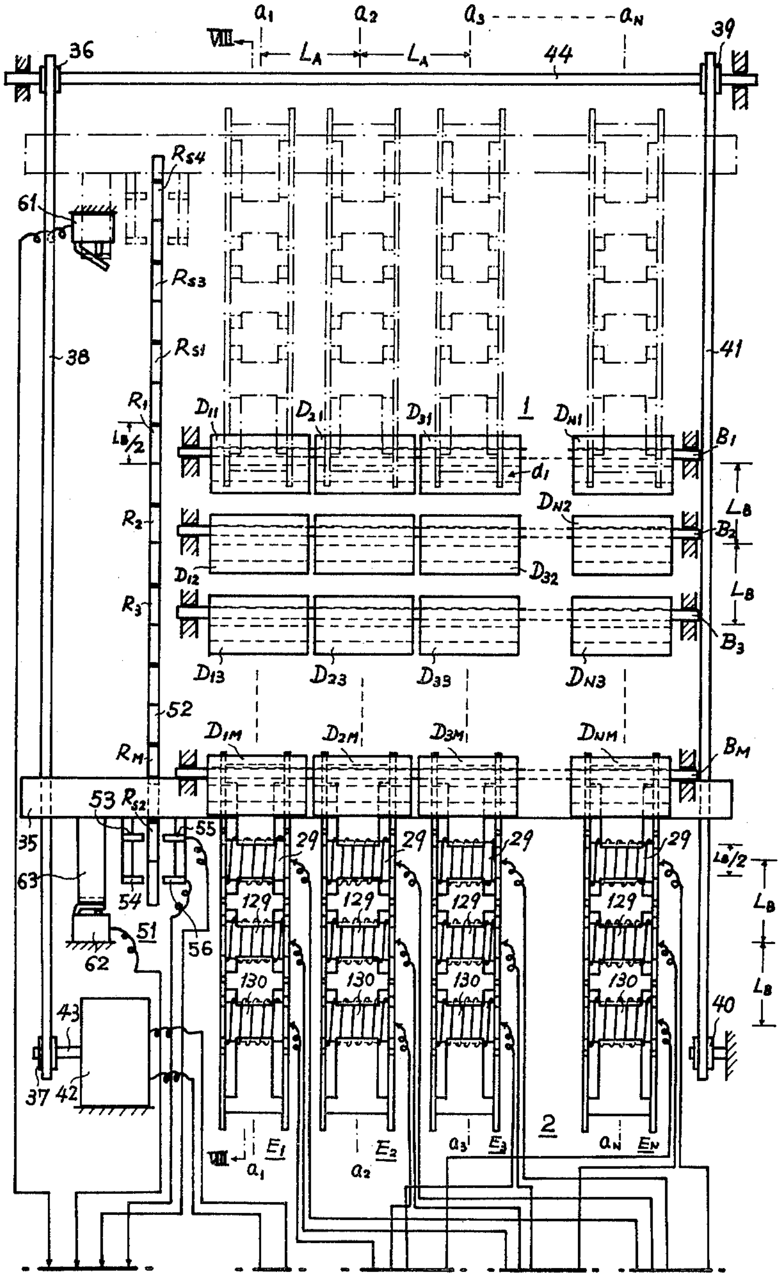
Figure 8:
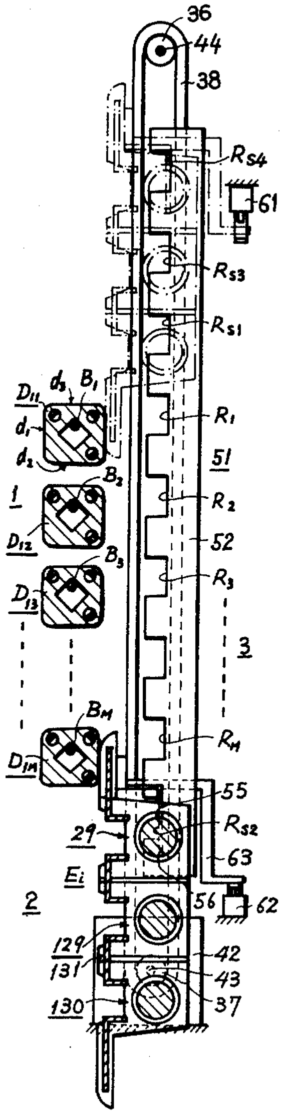
FIG. 8 is a sectional view taken on the line VIII—VIII in FIG. 7A.

Turning next to FIGS. 7 and 8, a second embodiment of this invention will be described, in which the parts corresponding to those in FIGS. 1 and 2 are marked with the same reference numerals and characters and no detailed description will be repeated. The second embodiment is identical in construction with the first embodiment shown in FIGS. 1 and 2 except for the following differences in the display element $D_{ij}$ of the display surface structure 1, the display control head $E_i$ of the display switching unit 2 and the drive circuit 70 of the drive unit 3.

Figure 9A:
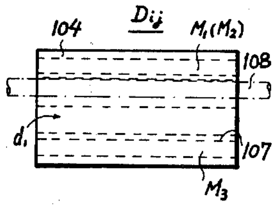
FIGS. 9A and 9B are respectively a front view of another example of the display element of this invention and its right side view.
Figure 9B:
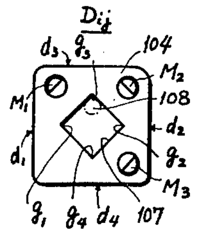

As shown in FIGS. 9A and 9B, the display element $D_{ij}$ of the display surface structure 1 is formed with a four-cornered rod-like member 104 which has two pairs of opposed display surfaces $d_1$ and $d_2$ and $d_3$ and $d_4$ of different colors and has a square cross section. The display element $D_{ij}$ has embedded therein magnetic pieces M at the corners except that between the display surfaces $d_1$ and $d_4$ to extend laterally. Further, a shaft receiving hole 107 is formed in the display element $D_{ij}$ in such a manner that when the latter is supported by a shaft, the pair of opposed display surfaces $d_1$ and $d_2$ or $d_3$ and $d_4$ may lie in vertical planes, respectively. The shaft receiving hole 107 of the display element $D_{ij}$ has a square cross section and is formed so that its two pairs of opposed corners are respectively spaced an angular distance of 45° from the corners of the four-cornered rod-like member 104. Letting the corners of the hole 107 corresponding to the display surfaces $d_1$, $d_2$, $d_3$ and $d_4$ be represented by $g_1$, $g_2$, $g_3$ and $g_4$, respectively, when a shaft 108 loosely inserted into the hole 107 as indicated by the chain line engages with either one of the corners $g_1$ and $g_2$, the display surfaces $d_3$ and $d_4$ lie in vertical planes and when the shaft 108 engages with either one of the corners $g_3$ and $g_4$, the display surfaces $d_1$ and $d_2$ lie in vertical planes.

Figure 10A:
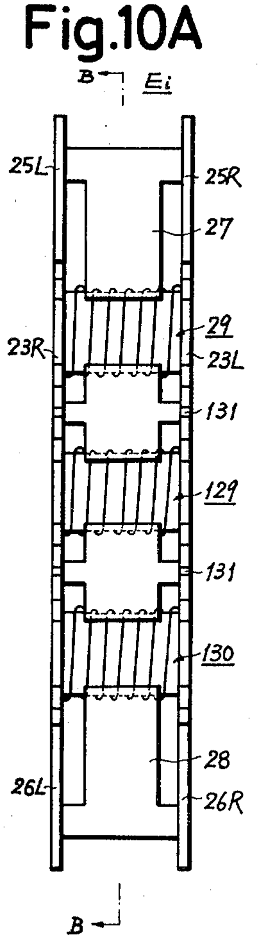
FIGS. 10A and 10B are respectively a front view of an example of a display control head applicable to the second embodiment of the display panel of this invention and a sectional view taken on the line B—B in FIG. 10A.
Figure 10B:
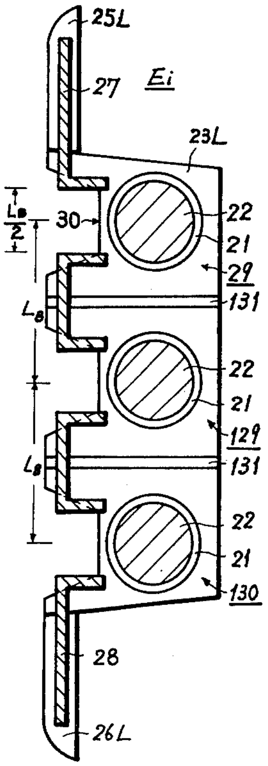

As depicted in FIGS. 10A and 10B, the display control head $E_i$ of the display switching unit 2 has the aforesaid electromagnet 29 and two other ones 129 and 130 similar thereto, the electromagnets 29, 129 and 130 being arranged downwardly in this order at the intervals $L_B$ referred to previously in respect of FIGS. 1 and 2. In this instance, it is preferred to insert a non-magnetic member 131 between adjacent ones of the electromagnets 29, 129 and 130 to prevent one of them from affecting the others.

Further, the drive circuit 70 of the drive unit 3 has another set of a memory circuit H', an address selector circuit F' and an output circuit J' in addition to the set of the memory circuit H, the address selector circuit F and the output circuit J. The data processing circuit G has two information input terminals x1 and x2 and three information output terminals y1, y2 and y3 and is adapted so that the information from the output circuits J and J' may be supplied to the information input terminals x1 and x2, respectively. Moreover, three shift registers K1, K2 and K3 are provided and information from the information output terminals y1, y2 and y3 of the data processing circuit G are applied to information input ends of the shift registers K1, K2 and K3, respectively. The output terminal $OE_i$ is omitted but instead three sets of output terminals $OE_{11}$ to $OE_{1N}$, $OE_{21}$ to $OE_{2N}$ and $OE_{31}$ to $OE_{3N}$ are provided, the output terminal $OE_{1i}$ being connected to the electromagnet 130 of the display control head $E_i$, the output terminal $OE_{2i}$ to the electromagnet 129 and the output terminal $OE_{3i}$ to the electromagnet 29. When an output "1" in the binary representation is supplied to the input terminal I3 from the photo detector 55 in the state that an output is obtained from the output terminal O1, information "1" in the binary representation and the clock pulse CP are sequentially derived from the output terminals y1, y2 and y3 of the data processing circuit G and the information "1" from the output terminals y1, y2 and y3 are respectively stored in the shift registers K1, K2 and K3 upon each occurrence of the clok pulse CP. Then, when the output from the photo detector 55 becomes "0", the information stored in the shift registers K1, K2 and K3 are led out to the output terminals $OE_{11}$ to $OE_{1N}$, $OE_{21}$ to $OE_{2M}$ and $OE_{31}$ to $OE_{3N}$ and then when the output from the photo detector 55 is altered to "1", such outputs are no more provided at the output terminals $OE_{11}$ to $OE_{1N}$, $OE_{2l}$ to OE2N and $OE_{31}$ to $OE_{3N}$. At the same time, the shift registers K1, K2 and K3 are reset to provide again the outputs "1" from the output terminals $y_1$, $y_2$ and $y_3$ of the data processing circuit G and these outputs are stored in the shift registers K1, K2 and K3. Then, when the output from the photo detector 55 becomes "0" again, outputs are provided from the output terminals $OE_{11}$ to $OE_{1N}$, $OE_{21}$ to $OE_{2N}$ and $OE_{31}$ to $OE_{1N}$ as in the above and thereafter such operations are repeated. When an output "0" in the binary representation is supplied to the input terminal I4 from the photo detector 56 in the state that an output is provided at the output terminal O2, the address selector circuits F and F', the memory circuits H and H', the data processing circuit G and the shift registers K1, K2 and K3 are controlled, by which information stored in the memory circuits H and H' are supplied via the output circuits J and J' to the data processing circuit G. The data processing circuit G provides at its output terminals y1, Y2 and y3 information "0", "0" and "0", respectively, in the case of the information from the memory circuits H and H' being "0" and "0", and information "1", "0" and "0" in the case of the latter information being "0" and "1". When the information from the memory circuits H and H' and "1" and "0", the data processing circuit G provides information "1", "0" and "0" at its output terminals y1, y2 and y3, respectively, and then if an output "0" in the binary representation is provided from the photo detector 56 in the above state, the information "1", "0" and "0" at the output terminals y1, y2 and y3 change to "0", "1" and "0", respectively. In the case of the information from the memory circuits H and H' being "1" and "1", the data processing circuit G provides information "1", "0" and "0" and then, if the output "0" is obtained from the photo detector 56 in the above state, the information at the output terminals y1, y2 and y3 change to "0", "1" and "0", respectively, and thereafter, if the output "0" is derived from the photo detector 56 in this state, the information at the abovesaid three output terminals change to "0", "0" and "1", respectively. The information thus obtained are sequentially stored in the shift registers K1, K2 and K3. Then, the output from the photo detector 56 to be supplied to the input terminal I4 becomes "1", the information stored in the shift registers K1, K2 and K3 are derived at the output terminals $OE_{11}$ to $OE_{1N}$, $OE_{21}$ to $OE_{2N}$ and $OE_{31}$ to $OE_{3N}$, respectively. And then, when the output from the photo detector 56 is altered to "0", no outputs are provided at the output terminals $OE_{11}$ to $OE_{1N}$, $OE_{21}$ to $OE_{2N}$ and $OE_{31}$ to $OE_{3N}$. At the same time, the shift registers K1, K2 and K3 are reset and, as described above, the address selector circuits F and F', the memory circuits H' and H', the data processing circuit G and the shift registers K1, K2 and K3 are respectively controlled, by which information stored at the next address is sequentially read out of the memory circuits H and H', and, as is the case with the above, the data processing circuit G is actuated and the information therefrom are stored in the shift registers K1, K2 and K3, respectively. Then, when the output from the photo detector 56 is altered again to "1", the information stored in the shift registers K1, K2 and K3 are derived at the output terminals $OE_{11}$ to $OE_{1N}$, $OE_{21}$ to $OE_{2N}$ and $OE_{27}$ to $OE_{3N}$, respectively, in the same manner as mentioned above and thereafter such operations are repeated. Further, the position detecting plate 52 of the detecting mechanism 51 of the drive unit 3 has formed therein recesses $R_{S3}$ and $R_{S4}$ similar to those $R_i$, $R_{Si}$ and $R_{S2}$ at the positions above the recess $R_{S1}$ and spaced therefrom the distances $L_B$ and $3L_B$, respectively.

The above is the construction of the second embodiment of this invention. With such a construction, if the power source switch S of the drive circuit 70 of the drive unit 3 is controlled to be turned ON for a very short period of time on the assumption that the horizontal rod 35 of the display switching unit 2 lies at its lowermost position to hold the detecting switch 62 in its ON state, the horizontal rod 35 is brought up as in the case described above with respect to FIGS. 1 and 2. Each time an output "1" is provided from the photo detector 55, information "1" from the data processing circuit G are stored in the shift registers K1, K2 and K3 of the drive circuit 70, respectively. And each time the photo detector 55 provides an output "0", the information stored in the shift registers are led out to the output terminals $OE_{11}$ to $OE_{1N}$, $OE_{21}$ to $OE_{2N}$ and $OE_{31}$ to $OE_{3N}$, respectively, and supplied to the electromagnets 29, 129 and 130 of the display control head $E_1$ to $E_N$ of the display switching unit 2 to energize them. When the display surface $d_1$ of the display element $D_{ij}$ of the display surface structure 1 lies on the front side as shown in FIGS. 9A and 9B, since the magnetic piece $M_3$ stays at the rear lower end portion, the magnetic piece $M_3$ is attracted by the energization of the electromagnet 29 to rotate the display element $D_{ij}$ through 90°. After such rotation, no magnetic piece lies at the rear lower end portion, so that even if the next electromagnet 129 arrives at the position opposite the display element $D_{ij}$, the display element $D_{ij}$ is not rotated and also when the electromagnet 130 moves into the opposing relation to the display element $D_{ij}$, the latter is not rotated. Accordingly, the display element $D_{ij}$ remains in its display state with the display surface $d_3$ retained on the front side. Where the display surface $d_4$ is on the front side, the magnetic piece $M_2$ lies at the rear lower end portion, so that it is attracted first by the electromagnet 29 to turn the display element $D_{ij}$ through 90°. After the above rotation, since the magnetic piece $M_3$ stays at the rear lower end portion, it is attracted by the next electromagnet 129 to rotate the display element $D_{ij}$ through 90°. Also after this rotation, no magnetic piece exists at the rear lower end portion, so that even if the next electromagnet 130 arrives at the position opposite the display element $D_{ij}$, the latter is not turned and remains in its display state with the display surface $d_3$ held on the front side. Where the display surface $d_2$ lies on the front side, the magnetic piece $M_1$ exists at the rear lower end portion and is attracted first by the electromagnet 29 to turn the display element $D_{ij}$ through 90°. Also in this case, the magnetic piece $M_2$ still exists at the rear lower end portion and is attracted by the next electromagnet 129 to further rotate the display element $D_{ij}$ through 90°, bringing the magnetic piece $M_3$ to the lower end portion of display element $D_{ij}$ on the rear side thereof. The magnetic piece $M_3$ is attracted by the next electromagnet 130 to turn the display element $D_{ij}$ through 90° to provide the display state in which the display surface $d_3$ stays on the front side. Where the display surface $d_3$ lies on the front side, since no magnetic piece exists at the lower end portion of the display element $D_{ij}$ on the rear side thereof, the display element $D_{ij}$ is not rotated by any of the electromagnets 29, 129 and 130 and remains in the display state that the display surface $d_3$ is retained on the front side. Consequently, by the upward movement of the horizontal rod 35, all of the display elements $D_{11}$ to $D_{N1}$, $D_{12}$ to $D_{N2}$, . . . $D_{1M}$ to $D_{NM}$ are brought into their display state that their display surfaces $d_3$ are held on the front side. When the horizontal rod 35 reaches its uppermost position to turn ON the detecting switch 61, the horizontal rod 35 is brought down in the same manner as described previously with regard to FIGS. 1 and 2. And each time an output "0" is derived from the photo detector 56, the address selector circuits F and F', the memory circuits H and H', the data processing circuit G and the shift registers K1, K2 and K3 of the drive circuit 70 are controlled to selectively energize the electromagnets 29, 129 and 130 of a selected one or ones of the display control heads $E_1$ to $E_N$ of the display switching unit 2 in accordance with the memory contents of the memory circuits H and H', by which a selected one or ones of the display elements $D_{11}$ to $D_{N1}$, $D_{12}$ to $D_{N2}$, . . . $D_{1M}$ to $D_{NM}$ are rotated to bring a predetermined one of the display surfaces $d_1$, $d_2$ and $d_4$ to the front side. When the horizontal rod 35 is moved down to its lowermost position to turn ON the detecting switch 62 to derive therefrom a detected output "1", the rotation of the motor 42 is stopped as is the case with the first embodiment described previously in respect of FIGS. 1 and 2.

In accordance with the above second embodiment of this invention, the display surfaces $d_3$ of all the display elements $D_{11}$ to $D_{N1}$, $D_{12}$ to $D_{N2}$, . . . $D_{1M}$ to $D_{NM}$ can be brought to face forwardly and a desired one of the display surfaces $d_1$, $d_2$ and $d_4$ of a desired one or ones of the display elements can be made to face forwardly. Accordingly, if the display surfaces $d_3$, $d_1$, $d_2$ and $d_4$ of the display elements $D_{ij}$ are previously colored, for example in white, red, green and blue, respectively, a character, symbol, graph or pattern can be displayed in colors as desired. Such a display can be produced with a simple construction as a whole. The display element $D_{ij}$ has also the same features as in the case of the first embodiment.

The foregoing embodiments should be construed as being merely illustrative of this invention and should not be construed as limiting the invention specifically thereto. The display surface of the display element $D_{ij}$ may also be a circular arc or like curved surface. It is also possible to make such an arrangement that when the horizontal rod 35 is moved down, the display surface $d_2$ (both in the first and second embodiments) is retained on the front side and that when the rod 35 is moved up, a desired display surface of a desired display element is held on the front side. Also, by repeating intermittently or continuously a series of operations for upward and then downward movements of the horizontal rod 35 of the display switching unit, the stored content of the memory circuit of the drive circuit 70 for each of the operations is changed correspondingly, whereby the display content can be altered for each operation. Further, the display element may also be formed with a triangular rod-like member which has three display surfaces and two magnetic pieces. In this case, each display control head has two electromagnets.

It will be apparent that many modifications and variations may be effected without departing from the scope of the novel concepts of this invention.

What is claimed is:

1. A display panel comprising:

a display surface structure;

a display switching unit; and a drive unit;

in which, letting N vertical lines of arrangement spaced a predetermined distance from adjacent ones of them in a horizontal direction be represented by $a_1$, $a_2$, . . . $a_N$, respectively, the display surface structure has M display elements $D_{i1}$, $D_{i2}$, . . . $D_{iM}$ disposed on the vertical line $a_i$ $(i+1, 2, \ldots N)$ at predetermined intervals in a vertical direction;

in which the display element $D_{ij}$ $(j+1, 2, \ldots M)$ is formed with a block member having a shaft receiving hole extending in the horizontal direction, an outer periphery forming a plurality of display surfaces of different colors to form a plurality of corners around the shaft receiving hole, and a magnetic piece disposed in each of the corners except one of them, the display element $D_{ij}$ being supported by a shaft loosely inserted into the shaft receiving hole in a manner to be rotatable about the shaft, the shaft receiving hole having such an inner peripheral configuration as to permit a selected one of the display surfaces to lie in a vertical plane in the state of the display element $D_{ij}$ being supported by the shaft;

in which the display switching unit has a display control head $E_i$ disposed to be movable along the vertical line $a_i$ in the vertical direction, the display control head $E_i$ having electromagnets less than the corners of the block member by one; and in which the drive unit has means for simultaneously moving down the display control heads $E_1$ to $E_N$ and means for driving the electromagnets of the display control head $E_i$ in synchronism with the movement of the display control head $E_i$.

2. A display panel according to claim 1, wherein the block member forming the display element $D_{ij}$ is plate-shaped, and hence has two corners and two display surfaces and has one magnetic piece, and wherein the display control head $E_i$ has one electromagnet.

3. A display panel according to claim 1, wherein the block member forming the display element $D_{ij}$ is a four-cornered block member, and hence four-corners and four display surfaces and has three magnetic pieces, and wherein the display control head $E_i$ has three electromagnets.

4. A display panel according to claim 1, wherein the display control head $E_i$ has a resilient piece for receiving the block member forming the display element $E_{ij}$.

5. A display element for a display panel, which is formed with a block member having a shaft receiving hole extending in a horizontal direction, an outer periphery forming a plurality of display surfaces of different colors to form a plurality of corners around the shaft receiving hole and a magnetic piece disposed in each of the corners except one of them and which has the construction that the block member is supported by a shaft loosely inserted into the shaft receiving hole and extending in the horizontal direction, and in which the shaft receiving hole has such an inner peripheral configuration as to permit a selected one of the display surfaces to lie in a vertical plane in the state of the block member being supported by the shaft.

6. A display element according to claim 5, wherein the block member is plate-shaped, and hence has two corners and two display surfaces and has one magnetic piece.

7. A display element according to claim 5, wherein the block member is four-cornered, and hence has four-corners and four display surfaces and has three magnetic pieces.

* * * * *